United States Patent
Decrop et al.

(10) Patent No.: US 11,654,634 B2
(45) Date of Patent: May 23, 2023

(54) THREE-DIMENSIONAL PRINTING USING GENERATIVE ADVERSARIAL NETWORK TECHNIQUES

(71) Applicant: International Business Machines Corporation, Armonk, NY (US)

(72) Inventors: Clement Decrop, Arlington, VA (US); Charles E. Beller, Baltimore, MD (US); Zachary A. Silverstein, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/341,810

(22) Filed: Jun. 8, 2021

(65) Prior Publication Data

US 2022/0388246 A1  Dec. 8, 2022

(51) Int. Cl.
*B29C 64/393* (2017.01)
*G06N 3/049* (2023.01)
*B33Y 50/02* (2015.01)
*G06F 30/00* (2020.01)
*B33Y 10/00* (2015.01)
*G06F 113/10* (2020.01)

(52) U.S. Cl.
CPC ............ *B29C 64/393* (2017.08); *B33Y 10/00* (2014.12); *B33Y 50/02* (2014.12); *G06F 30/00* (2020.01); *G06N 3/049* (2013.01); *G06F 2113/10* (2020.01)

(58) Field of Classification Search
CPC .................................................. B29C 64/393
See application file for complete search history.

(56) References Cited

U.S. PATENT DOCUMENTS

| | | | |
|---|---|---|---|
| 10,022,915 | B2 | 7/2018 | Bostick et al. |
| 10,118,345 | B2 | 11/2018 | Dimatteo et al. |
| 10,489,816 | B1 | 11/2019 | Duke et al. |

(Continued)

FOREIGN PATENT DOCUMENTS

| | | |
|---|---|---|
| CN | 107392873 A | 11/2017 |
| CN | 110328849 A | 10/2019 |

(Continued)

OTHER PUBLICATIONS

International Search Report and Written Opinion, International Application No. PCT/CN2022/095162, dated Aug. 30, 2022, 9 pgs.

(Continued)

*Primary Examiner* — Suresh Suryawanshi
(74) *Attorney, Agent, or Firm* — Peter Suchecki

(57) ABSTRACT

Provided is a system, method, and computer program product for generating a three-dimensional (3D) printable file of a complete object by re-assembling pieces of a broken object using generative adversarial network techniques. A processor may generate a 3D scan of each piece of a plurality of pieces of a broken object. The processor may assemble the 3D scan of each piece of the plurality of pieces to generate a re-assembled object, where the re-assembled object includes one or more gaps. The processor may fill the one or more gaps in the re-assembled object to create a complete object. The processor may generate a 3D printable file of the complete object.

20 Claims, 7 Drawing Sheets

(56) References Cited

U.S. PATENT DOCUMENTS

| | | | |
|---|---|---|---|
| 10,518,480 B2 | 12/2019 | Putman et al. | |
| 2014/0046473 A1* | 2/2014 | Boynton | B29C 64/118 |
| | | | 700/119 |
| 2015/0161294 A1* | 6/2015 | Mazula | G06F 30/00 |
| | | | 703/1 |
| 2016/0082665 A1* | 3/2016 | Snyder | B29C 64/35 |
| | | | 700/98 |
| 2016/0129638 A1 | 5/2016 | Bostick et al. | |
| 2018/0081334 A1* | 3/2018 | Bostick | G06F 30/00 |
| 2019/0012358 A1* | 1/2019 | Mousseau | G06F 21/105 |
| 2021/0279841 A1* | 9/2021 | Liu | G06N 3/0454 |

FOREIGN PATENT DOCUMENTS

| | | |
|---|---|---|
| CN | 112074399 A | 12/2020 |
| CN | 112634145 A | 4/2021 |
| TW | 518583 B | 11/2015 |
| TW | 202016504 A | 5/2020 |

OTHER PUBLICATIONS

Albertazzi, R., "Solving Jigsaw puzzles with Python and OpenCV," https://towardsdatascience.com/solving-jigsaw-puzzles-with-python-and-opencv-d775ba730660, Sep. 29, 2018, 16 pgs.

Anonymous, "3D Printer Broken Artifact Resiliency Module," an IP.com Prior Art Database Technical Disclosure, IP.com No. IPCOM000265161D, Mar. 4, 2021, 5 pgs.

Anonymous, "Augmented Reality Interface for Visualizing and Interacting with IoT Devices," an IP com Prior Art Database Technical Disclosure, IP.com No. IPCOM000255233D, Sep. 11, 2018, 22 pgs.

Anonymous, "Automatic Object Tracking," an IP.com Prior Art Database Technical Disclosure, IP.com No. PCOM000255187D, Sep. 7, 2018, 23 pgs.

Anonymous, "Dynamically Generated Product Assembly Presentation," an IP.com Prior Art Database Technical Disclosure, IP.com No. IPCOM000263236D, Aug. 10, 2020, 6 pgs.

IBM, "Shifting transport paradigms," Understanding the implications of 3D printing on the global transportation industry, IBM Global Business Services, Executive Report, https://www.ibm.com/downloads/cas/5XXANGMK, printed Apr. 21, 2021, 16 pgs.

Iuganson, R., "Real-time 3D printing control," Degree Thesis, Materials Processing Technology, 85 pgs., 2018.

Mell et al., "The NIST Definition of Cloud Computing," Recommendations of the National Institute of Standards and Technology, U.S. Department of Commerce, Special Publication 800-145, Sep. 2011, 7 pgs.

Tan, K.. "The Framework of Combining Artificial Intelligence and Construction 3D Printing in Civil Engineering," MATEC Web of Conferences 206, 01008 (2018), ICCEMS 2018, https://doi.org/10.1051/matecconf/201820601008, 5 pgs.

* cited by examiner

THREE-DIMENSIONAL PRINTING USING GENERATIVE ADVERSARIAL NETWORK TECHNIQUES

BACKGROUND

The present disclosure relates generally to the field of three-dimensional (3D) printing and, more specifically, to generating a 3D printable file of a complete object by re-assembling pieces of a broken object using generative adversarial network techniques.

3D printing or additive manufacturing is a process for making a physical object from a 3D digital model (e.g., CAD drawing or representation) by laying down many successive thin layers of a material using a 3D printing device.

SUMMARY

Embodiments of the present disclosure include a method, system, and computer program product for generating a three-dimensional (3D) printable file of a complete object by re-assembling pieces of a broken object using generative adversarial network techniques. A processor may generate a 3D scan of each piece of a plurality of pieces of a broken object. The processor may assemble the 3D scan of each piece of the plurality of pieces to generate a re-assembled object, where the re-assembled object includes one or more gaps. The processor may fill the one or more gaps in the re-assembled object to create a complete object. The processor may generate a 3D printable file of the complete object.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
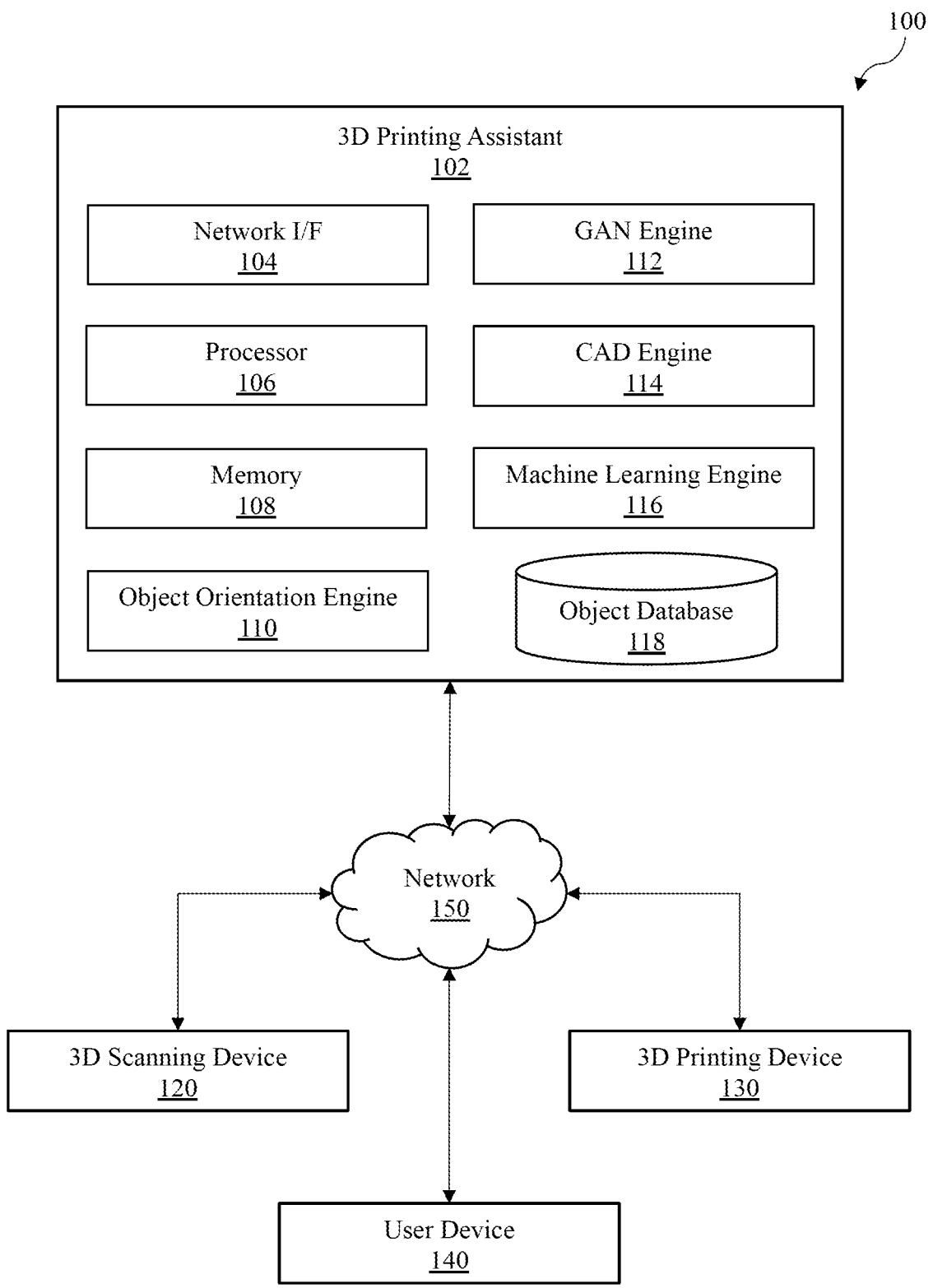
FIG. 1 illustrates a block diagram of an example three-dimensional printing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of 3D printing and, more particularly, to generating a 3D printable file of a re-assembled broken object using generative adversarial network techniques. While the present disclosure is not necessarily limited to such applications, various aspects of the disclosure may be appreciated through a discussion of various examples using this context.

3D printing or additive manufacturing is a process for making a physical object from a 3D digital model (e.g., CAD drawing or representation) by laying down many successive thin layers of a material using a 3D printing device. In many instances, a 3D printing-based production process circumvents many of the challenges and limitations of traditional manufacturing, especially those that lead to trade-offs between production and design and/or between production and transport. While 3D printers cannot make every imaginable product, the inventory of what can be produced using 3D printing is ubiquitous. For example, 3D printed products include those made from materials as diverse as plastic, metal and human tissue, and as complex as replacement joints, consumer clothing and engine parts. The number and complexity of products continues to grow rapidly as 3D printing technology evolves.

Many industries now use 3D printing as a means to keep various production lines running. For example, 3D printing may be used to quickly and easily create a necessary part for complex machinery when an unexpected failure of a critical piece occurs. In such a scenario, a user may retrieve a model ID or a digital model of the critical piece in order to produce an identical match of the broken piece using 3D printing. However, in many instances, a digital model of the failed piece may not be available. Therefore, the user may be required to order the piece directly and wait for the replacement piece to be delivered. This may result in significant downtime of the given production line.

Embodiments of the present disclosure include a method, system, and computer program product for generating a 3D printable file of a complete object by re-assembling pieces of a broken object using generative adversarial network techniques. In embodiments, an object may be broken into a plurality of pieces. For example, the object may be a critical component of a conveyor system in a manufacturing facility that has been broken into multiple pieces. A user may collect all the available pieces of the object and scan each piece using a 3D scanning device to generate 3D scans of each of the pieces of the broken object. Each 3D scan comprises a digital rendering of each given piece within a 3D physics based space. In some embodiments, the user may obtain and scan all the pieces of the broken object. However, in some embodiments, only a plurality of pieces may be scanned as some pieces may be unavailable for scanning due to various constraints (e.g., the user could not find one or more of the pieces due to the size, the piece has disintegrated, etc.).

In embodiments, the system will assemble the 3D scan of each piece of the plurality of pieces in a relative position to other pieces of the plurality of pieces to generate a re-assembled object. The system may use an object orientation engine to assemble the 3D scans of pieces when generating the re-assembled object. For example, the object orientation engine may utilize various computer vision techniques (e.g., shifting, placing, segmentation, etc.) that accurately predict the orientation of the scans to piece together the re-assembled object. In some embodiments, the object orientation engine may utilize various imaging data related to the object to aide in re-assembling the broken pieces of the object. For example, the object orientation engine may utilize one or more related CAD drawings, reference images (e.g., photographs), and/or blueprints that are associated with the object and/or individual pieces of the object to aide in generating the re-assembled object.

In embodiments, the re-assembled object may include one or more gaps that result from one or more pieces of the broken object being unavailable for scanning. For example, a user may only be able to collect and scan three out of five pieces of a broken object since two of the pieces were lost during failure of the object. Therefore, the object orientation engine may only reconstruct the re-assembled object using the 3D scans of the three available pieces, while one or more gaps remain in the re-assembled object where the unavailable fourth and fifth pieces would be located. In embodiments, the object orientation engine may utilize the related images to make determinations on how to orient the 3D scans of the broken pieces relative to each other when not all pieces are available. In this way, the orientation can accurately predict and generate the re-assembled object without requiring all the pieces of the broken object to be scanned.

In embodiments, the system may fill the one or more gaps in the re-assembled object to create a complete object. In embodiments, the system fills the one or more gaps in the re-assembled object using a generative adversarial network (GAN) technique. For example, the system may utilize a GAN engine that fills a gap or empty space by creating an artificial piece (or filler) of the object where the gap is located that can pass as a real 3D piece. In this way, the GAN engine may identify the fracture points in the re-assembled object and iteratively create a pre-fracture 3D rending of the complete object. In some embodiments, the GAN engine may use related image data of the object (e.g., CAD drawing, blueprint, reference images, etc.) to make predictions on how to fill any gaps and/or generate one or more components of the object that may not have been included in the 3D scans of the broken pieces. For example, the GAN engine may be configured to generate artificial protrusions that are visible in a reference image of the object, but do not appear in the 3D scans of the pieces of the broken object/re-assembled object. In this way, the GAN engine can predict various aspects or components of the broken object by correlating the 3D scans of the pieces of the broken object with related images of the object to accurately generate the complete object.

In some embodiments, the system may validate the complete object using a computer-aided design (CAD) testing software. In embodiments, the 3D printing system may use a CAD engine that utilizes various physics algorithms to make determinations regarding the accuracy of the complete object relative to the broken object. For example, the CAD engine may determine the accuracy of the artificial pieces that were generated to fill the one or more gaps of the re-assembled object. If the CAD engine determines that the complete object does not meet an accuracy threshold, then the CAD engine may not validate the complete object, resulting in the GAN engine performing additional generative iterations for filling the one or more gaps of the re-assembled object. The accuracy threshold(s) may be generated based on related image data (e.g., CAD drawings, reference images, etc.) of the original object or one or more similar objects. In some embodiments, the system may request and receive a manual validation input from a user that the complete object is a sufficient match to the pre-fracture object that broke. In this way, the user can manually validate the complete object. In response to validating the complete object, the system can generate a 3D printable file or standard triangle language (STL) file of the complete object.

Using the 3D printable file of the complete object, the system can initiate printing of the given object using communicatively couple 3D printing device. Returning to the example above, printing the complete object using this technique allows the user to quickly print and replace the critical component of the conveyor system in the manufacturing facility, thus reducing critical downtime. In this way, the system allows a user to easily produce replacement parts when a digital model of the part is unavailable.

In some embodiments, the system may utilize crowdsourcing to improve the quality of replacement parts or objects. For example, the system may be configured to receive feedback from users that indicate various parts or objects have failed or continue to fail at similar fracture points over time. Using the feedback and machine learning, the system can determine areas in the complete object that may be altered to prevent further failures when reproducing the part. For example, the system may increase the thickness of material (e.g., changing from 10 cm to 20 cm) in the area of the fracture points (e.g., gaps) on the 3D rendering of the complete object. In another example, based on the feedback, the system may recommend one or more different printing materials (e.g., based on a tensile strength determination of a set of printing materials) to be used when printing the complete object. This determination may be made in an instance where the thickness of the complete object may not be changed due to various fit constraints.

In embodiments, the system may store the individual 3D scans of broken pieces of the object, the re-assembled object, and the 3D printable file of the complete object within a database. These historical image data files may be used and/or leveraged when the system detects similar objects or pieces being scanned. In this way, the system may utilize historical data to help make predictions on orientating broken pieces and/or when filling one or more gaps in similar re-assembled objects.

In some embodiments, the user(s) must opt into the system in order for the system to collect, generate, and/or use their information (e.g., generate 3D scans, receive CAD drawings, analyze intellectual property, etc.). The user may determine which other users (e.g., third party user, second users, crowdsourced users, etc.) can access the collected data. For example, during an initialization process, the system may inform the user of the types of data that it will collect (e.g., image data, 3D scans, user feedback, etc.) and the reasons why the data is being collected. In these embodiments, the system will only start collecting the user information upon the user explicitly permitting the collection. Furthermore, the system may only collect the data that is necessary to generate the 3D printable file of the complete object. The data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example 3D printing system 100, in accordance with embodiments of the present disclosure. In the illustrated embodiment, 3D printing system 100 includes 3D printing assistant 102 that is communicatively coupled to 3D scanning device 120, 3D printing device 130, and user device 140 via network 150. 3D printing assistant 102 and user device 140 may be configured as any type of computer system and may be substantially similar to computer system 1101 of FIG. 4. In some embodiments, 3D printing assistant 102, 3D scanning device 120, and 3D printing device 130 may be configured as separate standalone systems or as one integrated system.

Network 150 may be any type of communication network, such as a wireless network or a cloud computing network. Network 150 may be substantially similar to, or the same as, cloud computing environment 50 described in FIG. 5. In some embodiments, network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, 3D printing assistant 102 may communicate with 3D scanning device 120, 3D printing device 130, and user device 140 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments 3D printing assistant 102 may communicate with 3D scanning device 120 and 3D printing device 130 using a hardwired connection, while communication between user device 140 and 3D printing assistant 102 may be through a wireless communication network.

In embodiments, 3D scanning device 120 may be any type of scanning device (e.g., 3D scanner) that is configured to generate 3D scans of one or more objects. In embodiments, 3D printing device 130 may be any type of printing device (e.g., 3D printer) that is configured to print and/or generate a physical 3D object. In some embodiments, 3D scanning device 120 and 3D printing device 130 may include some or similar components (e.g., processor, memory, machine learning engine, etc.) as 3D printing assistant 102, but for brevity purposes these components are not shown.

In the illustrated embodiment, 3D printing assistant 102 includes network interface (I/F) 104, processor 106, memory 108, object orientation engine 110, generative adversarial network (GAN) engine 112, computer-aided design (CAD) engine 114, machine learning engine 116, and object database 118.

In embodiments, object orientation engine 110 is configured to use various object orientation algorithms to assemble 3D scans (generated using 3D scanning device 120) of pieces of a broken object into a re-assembled object. The 3D scans of the pieces may be digitally rendered with a 3D physics based spaced. Object orientation engine 110 may analyze the 3D scans of the individual pieces using known computer vision techniques (e.g., shifting, placing, segmentation, OpenCV, etc.) to assemble broken pieces into a re-assembled object. In some embodiments, it is assumed that not all pieces of the broken object will be found and/or scanned, thus leaving one or more gaps in the reassembled version of the object. In some embodiments, object orientation engine 110 may utilize a CAD drawing/reference image of the object (prior to breaking) or a similar object to aide in predicting the reassembly of the broken pieces into the desired object. For example, large gaps may remain in the re-assembled object, where object orientation engine 110 may utilize an associated image (e.g., picture of the object before breaking, CAD drawing, etc.) to aid in aligning the plane against a single access. In embodiments, the CAD drawing/reference image may be received, retrieved, and/or stored on/from object database 118.

In embodiments, GAN engine 112 is configured to use GAN algorithms to fill in the one or more gaps in the reassembled object in order to generate a 3D printable file of the complete object (pre-fracture rending of the object). GAN engine 112 is configured to fill a gap or empty space by creating an artificial piece (or filler) of the object where the gap is located that can pass as a real 3D piece. For example, this may be performed by identifying various fault lines and/or fracture points on the 3D scans of individual pieces of the broken object and recreating flat planes from the fault lines until an artificial instance or piece of the object can be generated that meets a predetermined accuracy threshold value. The predetermined accuracy threshold value may be determined by correlating reference images or CAD drawings of the pre-fracture object and/or similar object. For example, the accuracy threshold may require that the filled gaps are with a 95% accuracy of the same area of the original object. In some embodiments, the GAN engine 112 may retrieve a set of rules that are used to fill in gaps due to material loss. For example, the rules may require a certain amount of fill (e.g., 2% fill, 98% fill, minimum fill, etc.) based on the alignment of the 3D scans of each of the pieces.

In embodiments, CAD engine 114 is configured to validate the complete object. The CAD engine 114 may use various CAD and/or physics algorithms to make determinations regarding the accuracy of the complete object relative to the broken object. For example, the CAD engine 114 may determine the accuracy of the complete object relative to the pre-fracture object by comparing various features extracted from the related CAD drawings or reference images of the object. If the CAD engine 114 determines that the complete object does not meet an accuracy threshold, then the CAD engine 114 may not validate the complete object, resulting in the GAN engine 112 performing additional generative iterations for filling the one or more gaps of the re-assembled object.

In embodiments, machine learning engine 116 may collect, monitor, and/or analyze various data (3D scans, artificial recreation of pieces, CAD drawings, etc.) related to the 3D printing system 100. Using the various data, machine learning engine 116 may automatically implement and/or adjust various thresholds used for validating the complete object. For example, machine learning engine 116 may identify from the collected data and/or feedback from users (received via user device 140) that a 3D printed complete object does not precisely match the original object that broke within a certain percentage threshold value. The machine learning engine 116 can take this data and adjust the accuracy thresholds such that verification of the complete object will not occur until the new threshold(s) is/are met.

In some embodiments, machine learning engine 116 can utilize machine learning and/or deep learning, where algorithms or models can be generated by performing supervised, unsupervised, or semi-supervised training on historical data related to generating the complete object (e.g., analyzing individual 3D scans of pieces, the re-assembled object, artificial pieces, etc.) and correlate historical success rates on recreating an accurate pre-fracture object using the 3D printable file. Over time, machine learning engine 116 may improve predictions on how to generate accurate artificial pieces in collaboration with GAN engine 112 that result in an improved 3D printed complete object/replacement object.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of 3D printing system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with 3D printing system 100 may not be present, and the arrangement of components may vary.

For example, while FIG. 1 illustrates an example 3D printing system 100 having a single 3D printing assistant 102, a single 3D scanning device 120, a single 3D printing device 130, and a single user device 140 that are communicatively coupled via a single network 150, suitable network architectures for implementing embodiments of this disclosure may include any number of 3D printing assistants, 3D scanning devices, 3D printing devices, user devices, and networks. The various models, modules, systems, and components illustrated in FIG. 1 may exist, if at all, across a plurality of 3D printing assistants, 3D scanning devices, 3D printing devices, user devices, and networks.

Figure 2:
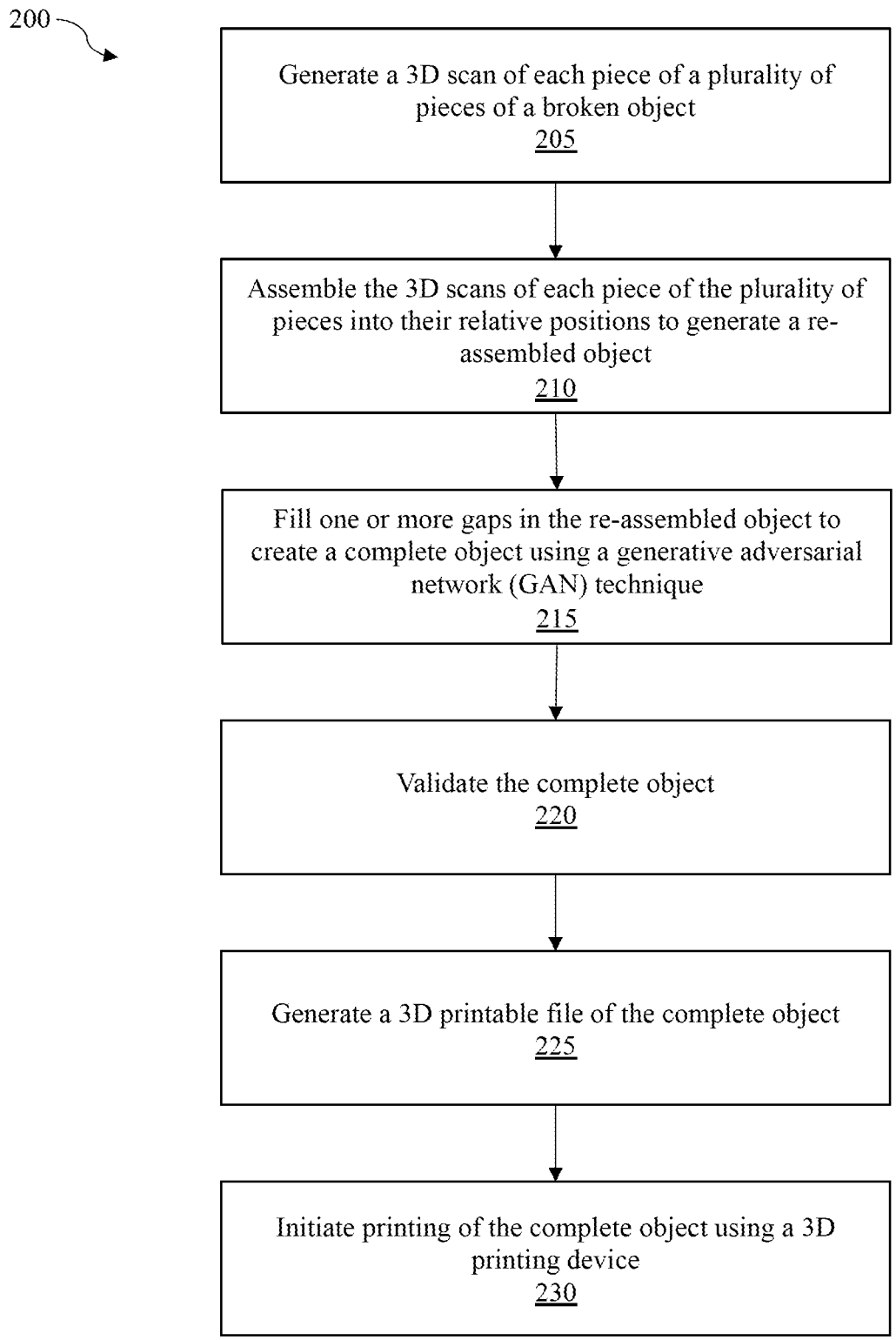
FIG. 2 illustrates a flow diagram of an example process for generating a three-dimensional printable file of a complete object, in accordance with embodiments of the present disclosure.

Referring now to FIG. 2, shown is a flow diagram of an example process 200 for generating a three-dimensional printable file of a complete object, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. In embodiments, the process 200 may be performed by processor 106 of 3D printing assistant 102 exemplified in FIG. 1.

Figure 3A:
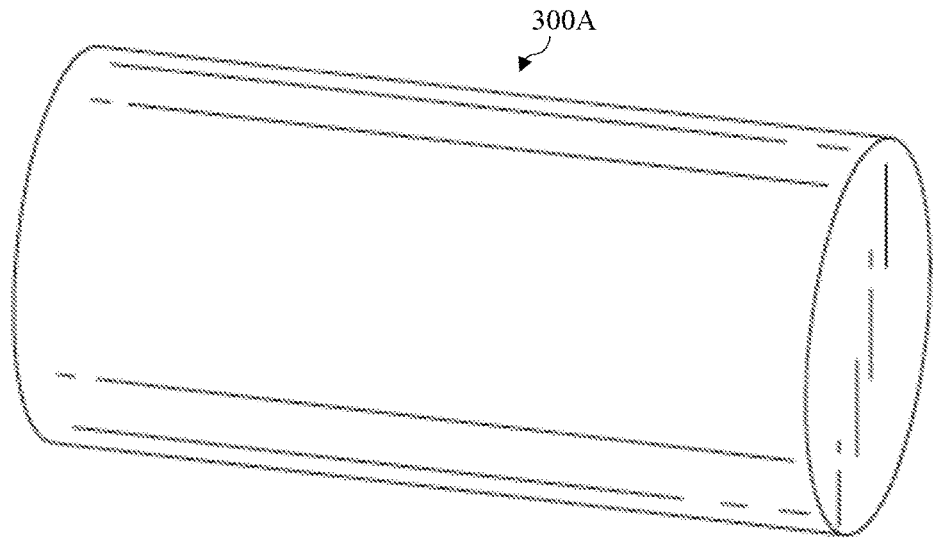
FIG. 3A illustrates an example object, in accordance with embodiments of the present disclosure.
Figure 3B:
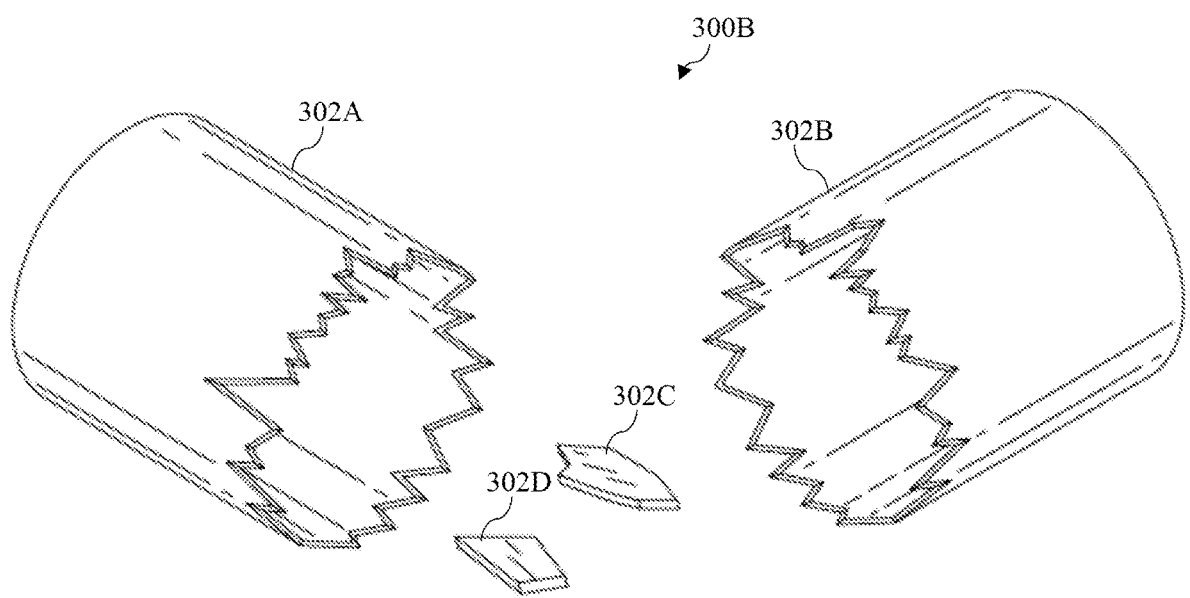
FIG. 3B illustrates an example broken object, in accordance with embodiments of the present disclosure.

The process 200 begins by generating a three-dimensional scan of each piece of a plurality of pieces of a broken object. This is illustrated at step 205. Referring to FIG. 3A and FIG. 3B, shown are an example object 300A and an example broken object 300B, respectively, in accordance with embodiments of the present disclosure. In embodiments, the object 300A may be any type of object that a user wants to recreate using a 3D printing device. For example, the object 300A may be a critical piece of a highly complex machine (e.g., a part to a robotic arm of an automated assembly line) that has broken unexpectedly into multiple pieces 302A, 302B, 302C, and 302D (collectively referred to as pieces 302). In order to recreate the object 300A using process 200, a user must collect the pieces 302 of the broken object 300B and scan each of the pieces 302 individually using a 3D scanner to generate a 3D scan of each piece. In some embodiments, a user may collect and scan all the pieces that make up the complete object. In some embodiments, a user may collect and scan a plurality of pieces that make up a significant portion of the object. For example, in some instances a user may be unable to collect all the pieces of the broken object due to various constraints and only certain pieces (e.g., larger pieces 302A and 302B) will be scanned. For example, pieces 302C and 302D may not be collected and scanned if they are too small to locate or if they were lost (e.g., disintegrated, projected to an unknown location due to shearing force, etc.) when the object 300A broke.

Figure 3C:
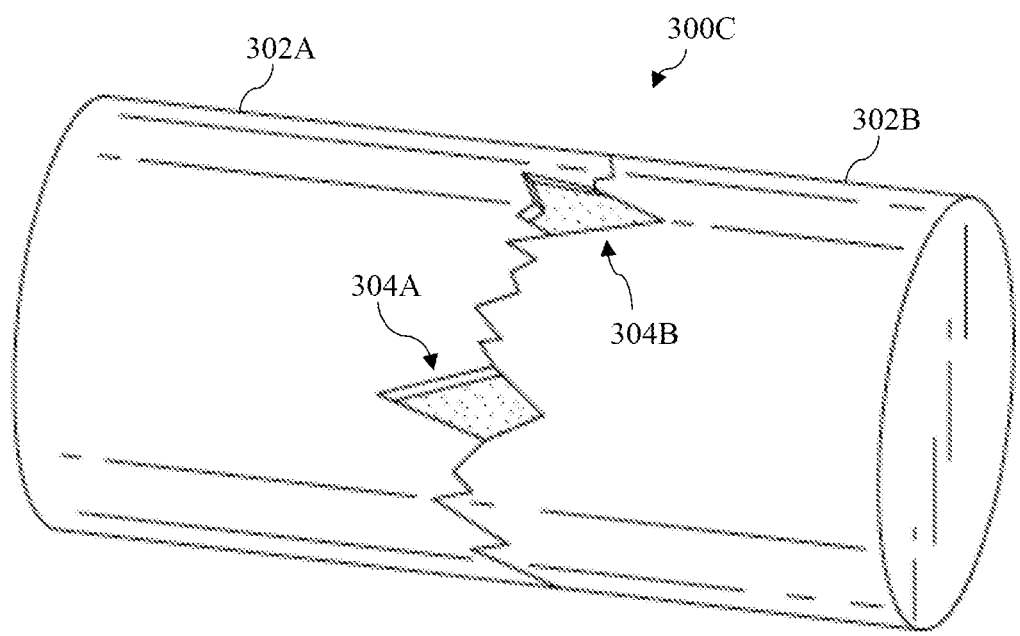
FIG. 3C illustrates a three-dimensional view of an example re-assembled object, in accordance with embodiments of the present disclosure.

The process 200 continues by assembling the 3D scan of each piece of the plurality of pieces in a relative position to other pieces of the plurality of pieces to generate a re-assembled object. This is illustrated at step 210. Each piece of the plurality of pieces of the broken object is scanned and digitally rendered within a 3D physics based space by the system. Referring to FIG. 3C, shown is a three-dimensional view of an example re-assembled object 300C, in accordance with embodiments of the present disclosure. In the illustrated embodiment, the 3D scans of pieces 302A and 302B are assembled by the system in the relative position to each other to generate the re-assembled object 300C. The system may use an object orientation engine (e.g., object orientation engine 110) to assemble the 3D scans of pieces 302A and 302B to generate the re-assembled object 300C. The object orientation engine may utilize various computer vision techniques (e.g., shifting, placing, segmentation, etc.) to accurately predict the orientation of the 3D scans to generate the re-assembled object 300C.

In some embodiments, the object orientation engine may utilize various image data related to the object to aide in re-assembling the broken pieces of the object. For example, the object orientation engine may utilize one or more related CAD drawings, reference images, and/or blueprints that are associated with the object and/or individual pieces of the object to aide in generating the re-assembled object 300C. For example, the re-assembled object 300C includes gaps 304A and 304B (collectively referred to as gaps 304). These gaps 304 correspond to pieces 302C and 302D that were not scanned due to various constraints (e.g., the pieces were unavailable/lost when collecting the broken pieces of the object). The object orientation engine may utilize the related images the object to make determinations on how to orient the 3D scans of the broken pieces when not all pieces are available. In this way, the object orientation engine can accurately predict and generate the re-assembled object without requiring all the pieces of the broken object to be scanned.

Figure 3D:
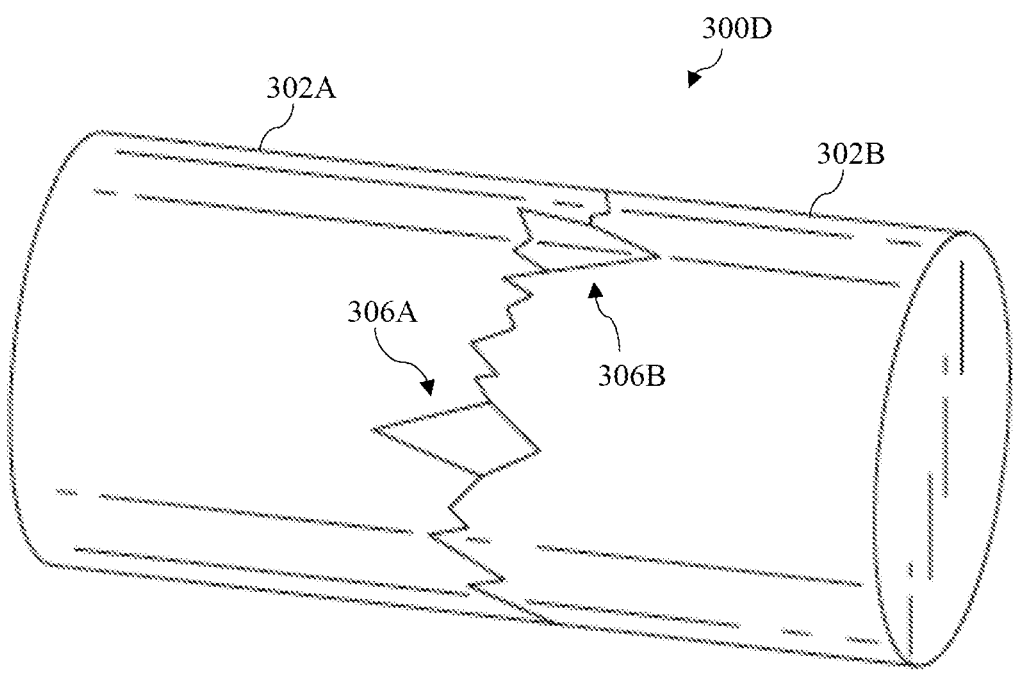
FIG. 3D illustrates a three-dimensional view of an example complete object, in accordance with embodiments of the present disclosure.

The process 200 continues by filling the one or more gaps in the re-assembled object to create a complete object. This is illustrated at step 215. In embodiments, the system fills the one or more gaps in the re-assembled object using a generative adversarial network (GAN) technique. In embodiments, the system may utilize a GAN engine (e.g., GAN engine 112) that fills the gap or empty space by creating an artificial piece (or filler) of the object where the gap is located that can pass as a real 3D piece. Referring to FIG. 3D, shown is three-dimensional view of an example complete object 300D, in accordance with embodiments of the present disclosure. In the illustrated embodiment, the complete object 300D includes 3D renderings of artificial pieces 306A and 306B (collectively referred to as artificial pieces 306) that were generated by the GAN engine to replace/fill the gaps 304 in the re-assembled object 300C to create the complete object 300D. In some embodiments, the GAN engine may use related image data of the object (e.g., CAD drawing, blueprint, reference images, etc.) to make predictions on how to fill any gaps or generate one or more components/aspects of the object that may not have been included/present in the 3D scans of the broken pieces. For example, one or more protrusions may have been shown in a related image of the object, but not included in any of the 3D scans of the available broken pieces. Using the related images of the object, the GAN engine may predict and fill an area or gap with a 3D artificial protrusion where a pre-fracture protrusion is determined to have been located based on the related image. In this way, the GAN engine may predict additional components or aspects of the object when generating the complete object based on correlating one or more related images.

In some embodiments, the process 200 continues by validating the complete object using a computer-aided design (CAD) testing software. This is illustrated at step 220. In embodiments, the system may use a CAD engine (e.g., CAD engine 114) that utilizing various physics algorithms to make determinations regarding the accuracy of the complete object relative to the broken object. For example, the CAD engine may determine the accuracy of the artificial pieces generated to fill the one or more gaps of the re-assembled object. If the CAD engine determines that the complete object does not meet an accuracy threshold, then the CAD engine may not validate the complete object, and the process will return to step 215 resulting in the GAN engine performing additional generative iterations for filling the one or more gaps of the re-assembled object. In some embodiments, a user may manually validate the complete object. This may allow the user to override any accuracy thresholds. For example, the user may only need a complete object that matches the original object within an 80% threshold, however the accuracy threshold may be set at 90%. In such an instance, the suer may override the CAD engine validation and manually validate the complete object.

In response to the complete object being validated, the process 200 continues by generating a 3D printable file of the complete object. This is illustrated at step 225. For example, the 3D rending of the complete object may be transformed into a 3D printable file of the complete object. In some embodiments, the system may generate a standard triangle language (STL) file of the complete object. The 3D printable file and/or STL file may be stored on a database where the user can access the file to print the object.

In some embodiments, the process 200 continues by initiating printing of the complete object using a 3D printing device. This is illustrated at step 230. For example, the system may be communicatively connected to a 3D printer, such that once the 3D printable file of the complete is available, the system can automatically initiate printing of the object. In some embodiments, the system may also output or generate 3D printable files corresponding to the individual 3D scans of the pieces of the broken object, the re-assembled object, and/or the artificially created pieces generated by the GAN engine. These 3D printable files may be used to print the respective object or piece in attempt to determine why or where fracture points occur.

In some embodiments, the system may receive feedback from one or more users (via user device 140) indicating a modification of the complete object should be made to prevent the complete object from breaking similarly to the broken object. For example, users may provide feedback indicating that the object keeps breaking in the same spot or fracture point. In response to the feedback, the system may determine using machine learning that the area including the one or more gaps that were filled needs to be modified. For example, the system may determine that the area needs to be modified to have a thickness of 50 mm instead of 25 mm to prevent future breaks. Using machine learning, the system may automatically update the 3D printable file of the complete object with the modification. In another example, the thickness of the complete object may not be capable of modification due to various fit constraints. Therefore, the system may recommend changing a first printing material to a second printing material by analyzing a set of tensile strength values corresponding to a set of available printing materials. In this way, the system can recommend using stronger printing materials when a printed object repeatably fails.

Figure 4:
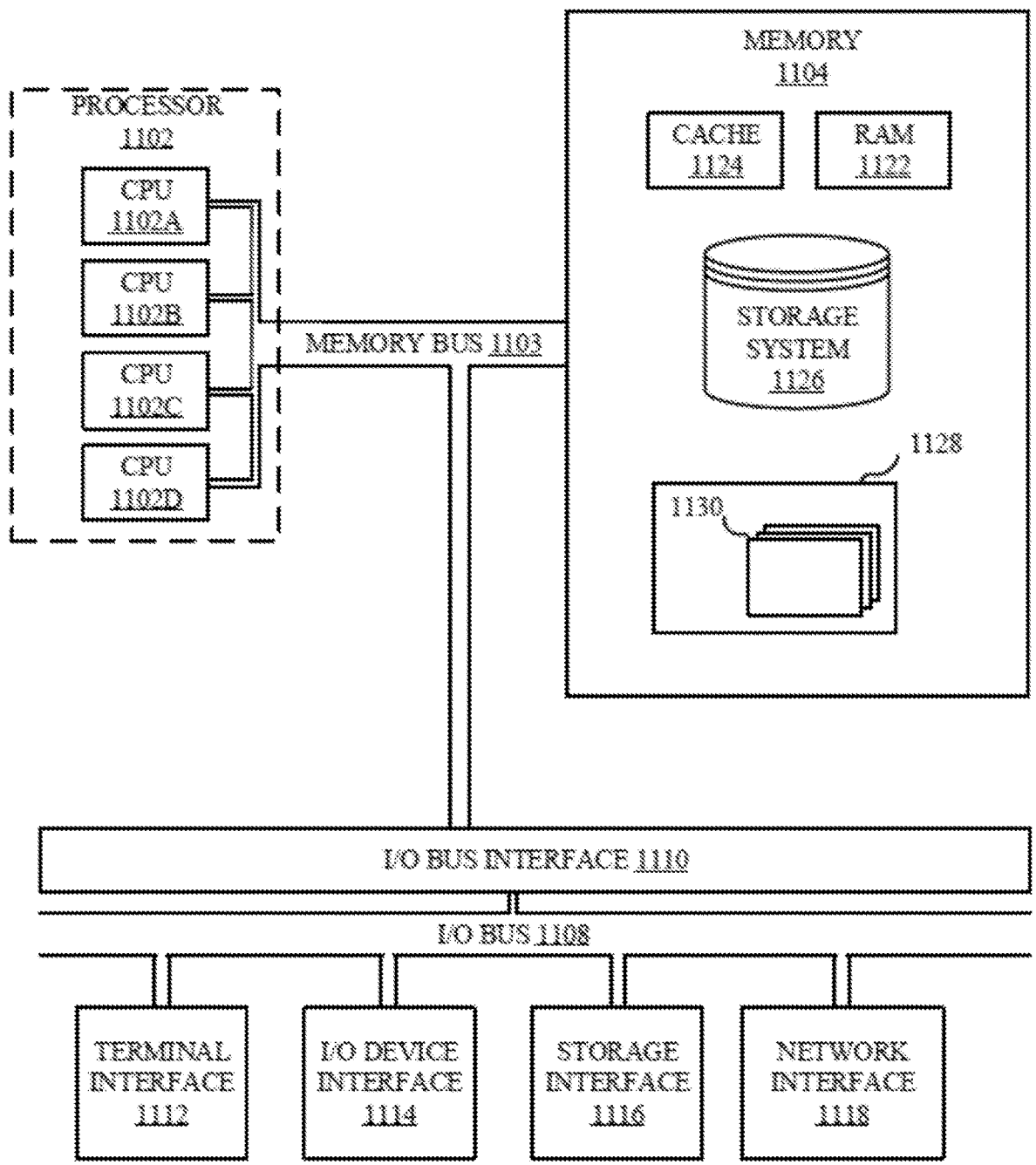
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 as described in FIG. 2). In some embodiments, the computer system 1101 may be configured as 3D printing system 100 of FIG. 1.

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 4 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 1101. In some embodiments, however, individual components may have greater or lesser complexity than as represented in FIG. 4, components other than or in addition to those shown in FIG. 4 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various 3D printing assistants through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
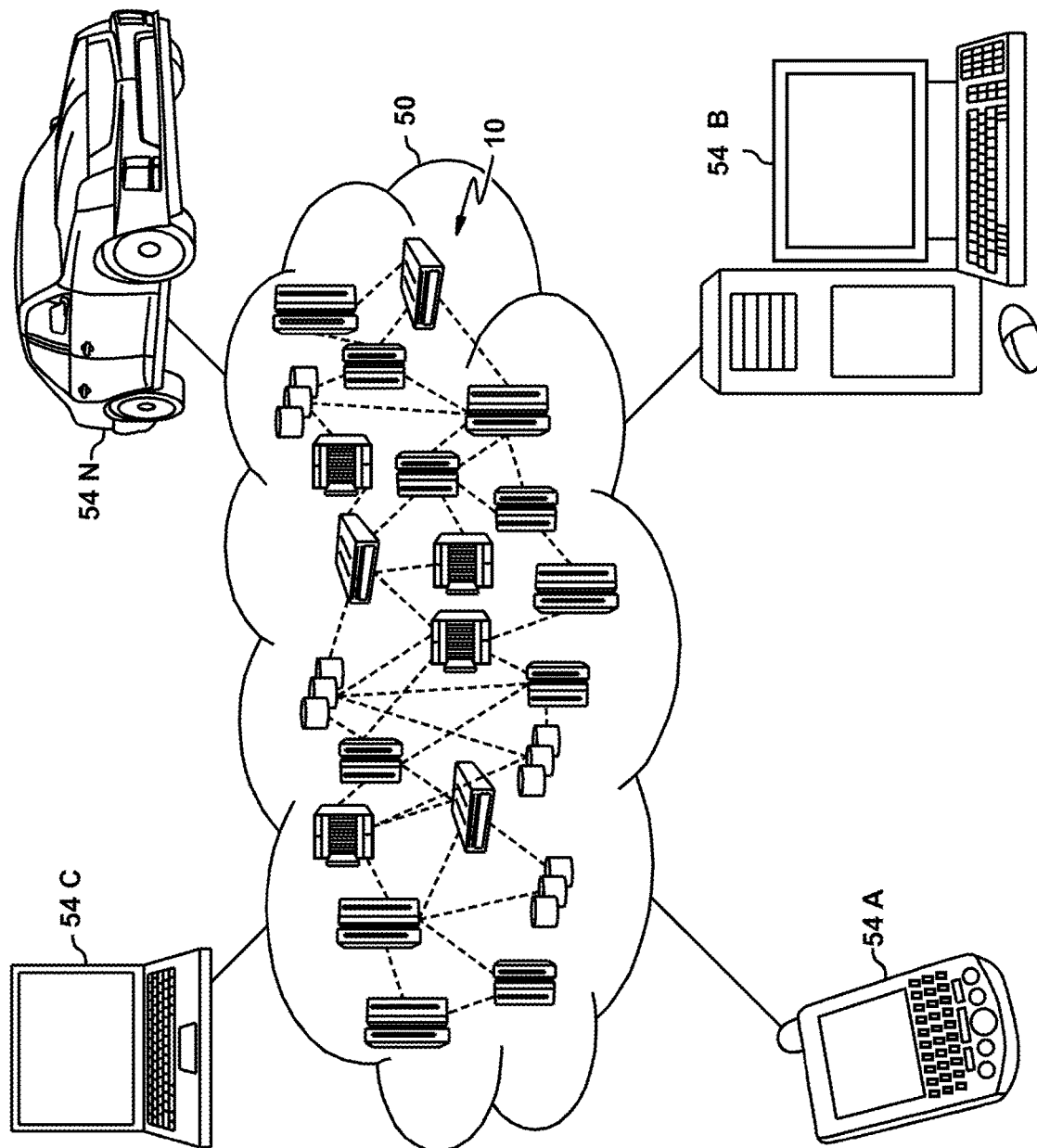
FIG. 5 depicts a cloud computing environment in accordance with embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
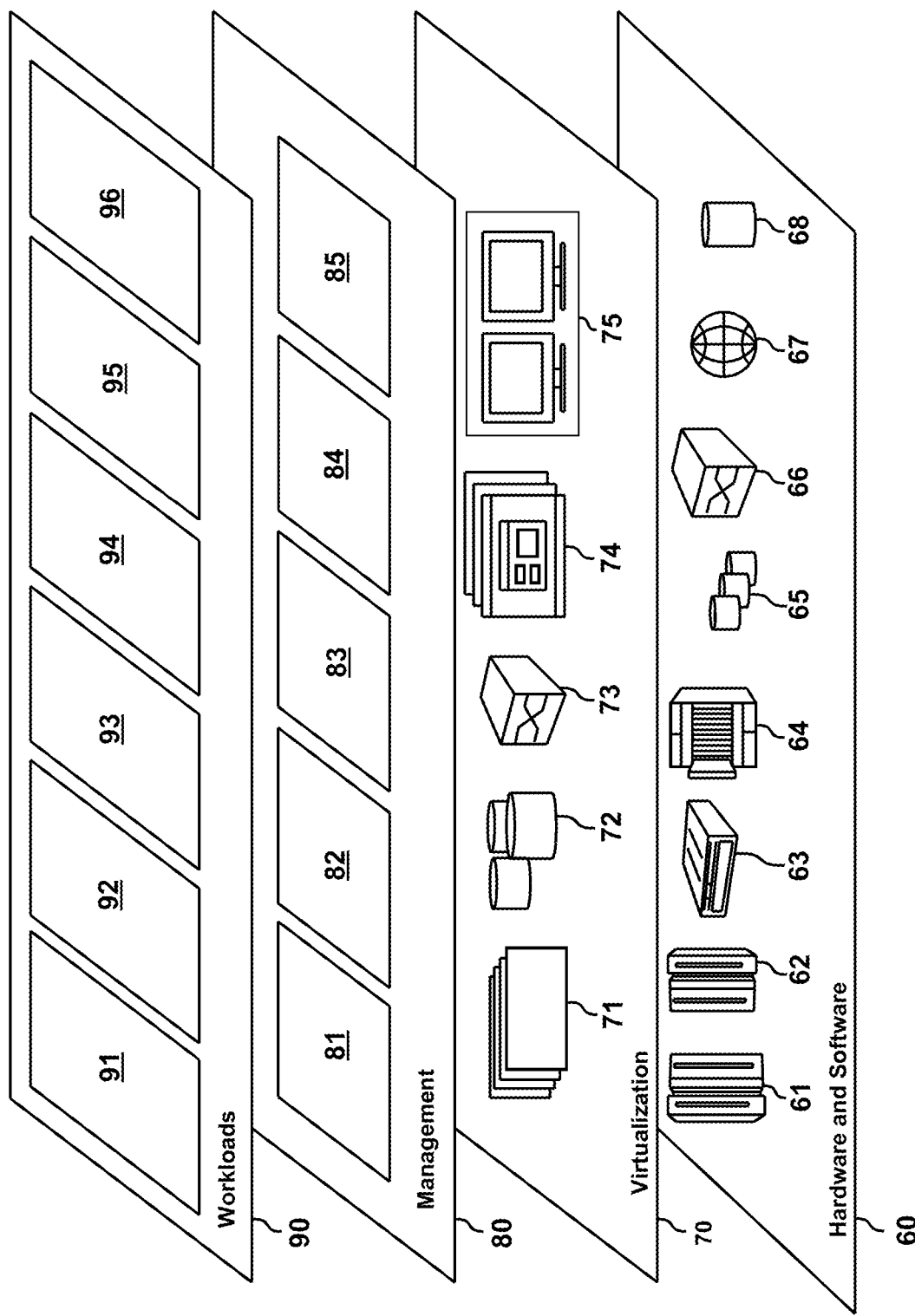
FIG. 6 depicts abstraction model layers in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and 3D printing assistant 68 in relation to the 3D printing system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 3D object recreation and printing 96. For example, 3D printing system 100 of FIG. 1 may be configured to perform generation of a 3D printable file of a complete object using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
generating a three-dimensional (3D) scan of each piece of a plurality of pieces of a broken object;
assembling the 3D scan of each piece of the plurality of pieces to generate a re-assembled object, wherein the re-assembled object includes one or more gaps;
filling, using one or more generative adversarial network (GAN) algorithms, the one or more gaps in the re-assembled object with an artificially generated piece to create a complete object; and
generating a 3D printable file of the complete object.

2. The method of claim 1, further comprising:
validating the complete object using a computer-aided design (CAD) testing software.

3. The method of claim 1, further comprising:
sending a command to a 3D printing device to initiate printing of the complete object using the 3D printable file.

4. The method of claim 1, further comprising:
detecting that the broken object is within a predetermined similarity threshold to a second object having a corresponding 3D printable file in a database; and
correlating the corresponding 3D printable file with the 3D scan of each piece of the plurality of pieces to aide in predicting a relative position of each piece to other pieces of the plurality of pieces when generating the re-assembled object and filling the one or more gaps in the re-assembled object.

5. The method of claim 1, further comprising:
receiving feedback from one or more users indicating a modification of the complete object should be made to prevent the complete object from breaking similarly to the broken object;
determining, based on the feedback, an area of the complete object to modify; and
updating, in response to the determining, the 3D printable file with the modification to the area of the complete object.

6. The method of claim 5, wherein the area to be modified includes, at least in part, the one or more gaps that were filled in the re-assembled object, and wherein the modification includes increasing a thickness of the area.

7. The method of claim 5, wherein the area to be modified includes, at least in part, the one or more gaps that were filled in the re-assembled object, and wherein the modification comprises implementing a change in a material used when printing of the complete object.

8. A system comprising:
a processor; and
a computer-readable storage medium communicatively coupled to the processor and storing program instructions which, when executed by the processor, cause the processor to perform a method comprising:
generating a three-dimensional (3D) scan of each piece of a plurality of pieces of a broken object;
assembling the 3D scan of each piece of the plurality of pieces to generate a re-assembled object, wherein the re-assembled object includes one or more gaps;
filling, using one or more generative adversarial network (GAN) algorithms, the one or more gaps in the re-assembled object with an artificially generated piece to create a complete object; and
generating a 3D printable file of the complete object.

9. The system of claim 8, wherein the method performed by the processor further comprises validating the complete object using a computer-aided design (CAD) testing software.

10. The system of claim 8, wherein the method performed by the processor further comprises sending a command to a 3D printing device to initiate printing of the complete object using the 3D printable file.

11. The system of claim 8, wherein the method performed by the processor further comprises:
detecting that the broken object is within a predetermined similarity threshold to a second object having a corresponding 3D printable file in a database; and
correlating the corresponding 3D printable file with the 3D scan of each piece of the plurality of pieces to aide in predicting a relative position of each piece to other pieces of the plurality of pieces when generating the re-assembled object and filling the one or more gaps in the re-assembled object.

12. The system of claim 8, wherein the method performed by the processor further comprises:
receiving feedback from one or more users indicating a modification of the complete object should be made to prevent the complete object from breaking similarly to the broken object;
determining, based on the feedback, an area of the complete object to modify; and
updating, in response to the determining, the 3D printable file with the modification to the area of the complete object.

13. The system of claim 12, wherein the area to be modified includes, at least in part, the one or more gaps that were filled in the re-assembled object, and wherein the modification includes increasing a thickness of the area.

14. The system of claim 12, wherein the area to be modified includes, at least in part, the one or more gaps that were filled in the re-assembled object, and wherein the modification comprises implementing a change in a material used when printing of the complete object.

15. A computer program product comprising a computer-readable storage medium having program instructions embodied therewith, the program instructions executable by a processor to cause the processor to perform a method comprising:
generating a three-dimensional (3D) scan of each piece of a plurality of pieces of a broken object;
assembling the 3D scan of each piece of the plurality of pieces to generate a re-assembled object, wherein the re-assembled object includes one or more gaps;
filling, using one or more generative adversarial network (GAN) algorithms, the one or more gaps in the re-assembled object with an artificially generated piece to create a complete object; and
generating a 3D printable file of the complete object.

16. The computer program product of claim 15, wherein the method performed by the processor further comprises validating the complete object using a computer-aided design (CAD) testing software.

17. The computer program product of claim 15, wherein the method performed by the processor further comprises:
receiving feedback from one or more users indicating a modification of the complete object should be made to prevent the complete object from breaking similarly to the broken object;
determining, based on the feedback, an area of the complete object to modify; and
updating, in response to the determining, the 3D printable file with the modification to the area of the complete object.

18. The method of claim 1, wherein filling the one or more gaps in the re-assembled object with the artificially generated piece to create the complete object comprises:
identifying one or more fracture points and/or one or more fault lines of each piece of the plurality of pieces of the re-assembled object; and
generating, using the one or more GAN algorithms, one or more planes extending from the one or more fracture points and/or one or more fault lines of each piece of the plurality of pieces of the re-assembled object to create the artificially generated piece.

19. The method of claim 1, further comprising:
comparing an accuracy value associated with the artificially generated piece to a predetermined accuracy threshold, wherein the predetermined accuracy threshold was determined based on reference images of a similar object as the broken object; and
regenerating, using the one or more GAN algorithms, one or more new planes extending from the one or more fracture points and/or the one or more fault lines of each piece of the plurality of pieces until the accuracy value of the artificially generated piece meets the predetermined accuracy threshold.

20. The method of claim 1, further comprising:
retrieving a set of rules associated with material loss criteria that are used to determine how the one or more gaps of the reassembled object are filled by the one or more GAN algorithms.

* * * * *